(12) United States Patent
Takeyama et al.

(10) Patent No.: US 7,247,840 B2
(45) Date of Patent: Jul. 24, 2007

(54) IMAGE FORMING APPARATUS, AND METHOD OF CORRECTING TIMING FOR GENERATING LASER BEAMS

(75) Inventors: Yoshinobu Takeyama, Tokyo (JP); Nobuyuki Yanagawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 196 days.

(21) Appl. No.: 10/669,009

(22) Filed: Sep. 24, 2003

(65) Prior Publication Data

US 2004/0056178 A1    Mar. 25, 2004

(30) Foreign Application Priority Data

Sep. 24, 2002 (JP) ............................. 2002-276635

(51) Int. Cl.
*H01J 3/14* (2006.01)
*H01J 5/16* (2006.01)
*H01J 40/14* (2006.01)

(52) U.S. Cl. ................ 250/234; 347/234; 347/248
(58) Field of Classification Search ........ 250/234–236; 358/474, 493, 494; 347/234–235, 248–250
See application file for complete search history.

(56) References Cited

U.S. PATENT DOCUMENTS

| 4,835,780 A | 5/1989 | Sugimura et al. |
| 4,837,588 A | 6/1989 | Imakawa et al. |
| 4,888,777 A | 12/1989 | Takeyama |
| 4,962,431 A | 10/1990 | Imakawa et al. |
| 5,059,987 A | 10/1991 | Takeyama et al. |
| 5,095,315 A | 3/1992 | Takeyama |
| 5,122,678 A | 6/1992 | Takeyama |
| 5,258,780 A | 11/1993 | Ema et al. |
| 5,294,944 A | 3/1994 | Takeyama et al. |
| 5,424,765 A * | 6/1995 | Fujii et al. .................. 347/248 |
| 6,151,152 A * | 11/2000 | Neary ........................ 359/216 |
| 6,157,797 A | 12/2000 | Saito et al. |
| 6,222,566 B1 | 4/2001 | Takeyama et al. |
| 6,243,124 B1 * | 6/2001 | Ozaki et al. ................ 347/236 |
| 6,256,461 B1 * | 7/2001 | Takeyama et al. ........... 399/66 |
| 6,263,178 B1 | 7/2001 | Takeyama et al. |
| 6,292,641 B1 | 9/2001 | Takeyama et al. |
| 2001/0028387 A1 * | 10/2001 | Maeda ....................... 347/232 |
| 2003/0067533 A1 * | 4/2003 | Omori et al. ............... 347/248 |

FOREIGN PATENT DOCUMENTS

| JP | 62-254110 | 11/1987 |
| JP | 9-58053 | 3/1997 |
| JP | 2001180043 A * | 7/2001 |

* cited by examiner

*Primary Examiner*—Stephone B. Allen
*Assistant Examiner*—Suezu Ellis
(74) *Attorney, Agent, or Firm*—Oblon, Spivak, McClelland, Maier & Neustadt, P.C.

(57) ABSTRACT

A printer includes laser beam detecting sensors for detecting a laser beams at two positions in the main scanning direction. Write clock generating circuits measure a number of counts of a predetermined clock during a period since one of the laser beam detecting sensors detects each of the beams until another sensor detects the beam. A write clock frequency adjusting circuit takes the number of counts for one laser beam as a reference value and adjusts write clock frequencies of other laser beams so as to coincide with the reference value.

9 Claims, 7 Drawing Sheets

IMAGE FORMING APPARATUS, AND METHOD OF CORRECTING TIMING FOR GENERATING LASER BEAMS

BACKGROUND OF THE INVENTION

1) Field of the Invention

The present invention relates to an image forming apparatus and a method of correcting timing for generating laser beams that takes accounts for fluctuations in temperature.

2) Description of the Related Art

An image forming apparatus writes image information on a photoreceptor by scanning the photoreceptor with laser beams. The laser beams are deflected, for scanning the photoreceptor, with a polygon mirror and a fθ lens. Sometimes an achromatic fθ lens is used to suppress variations in writing magnification as disclosed, for example, in Japanese Patent Application Laid Open (JP-A) No. SHO 62-254110 (see pages 1 and 2, and FIG. 1). However, if the achromatic fθ lens is made of glass, it increases the weight and cost of the apparatus. Therefore, to realize weight and cost reduction, fθ lenses made of plastic are becoming popular.

However, the plastic lenses have a problem that they deform due to change in ambient temperature and change in temperature inside the apparatus. Moreover, the polygon mirrors have a problem that their figure tolerance changes due to change in ambient temperature and change in temperature inside the apparatus. If the lens deforms or the figure tolerance of the polygon mirror changes, the precision of the image formation degrades, because, it shifts the scanning position. The effect becomes prominent when the photoreceptor is scanned with a plurality of laser beams, because, there occurs color misalignment due to a magnification error in a main scanning direction and each magnification error of the beams.

One approach to solve the above mentioned problem is disclosed, for example, in JP-A No. HEI 9-58053 (see pages 2 to 5, and FIG. 1). FIG. 8 is a conceptual diagram of an optical writing system of this image forming apparatus. FIG. 8 illustrates only one optical writing system although there are a plurality of optical writing systems.

The image forming apparatus includes a laser diode 101, which emits a laser beam, and a laser driving circuit 109, which drives the laser diode. The laser beam emitted from the laser diode 101 is deflected by a polygon mirror 102 towards the photoreceptor 103. Laser detecting sensors 105 and 106 are provided along the main scanning direction. When the laser detecting sensor 105 detects a laser beam, it outputs a detection signal det 1, and when the laser detecting sensor 106 detects a laser beam, it outputs a detection signal det 2, to a write clock generating circuit 107. The write clock generating circuit 107 measures a number of counts of a predetermined clock (hereinafter, also referred to as "a number of clocks") during a period between detection of a detection signal det 1 and detection of a subsequent detection signal det 2. The write clock generating circuit 107 compares the value of the clocks obtained by the measurement (hereinafter, "measured value") with a reference value, and outputs a write clock CLK0 of a frequency such that the measured value substantially coincides with the reference value. The laser driving circuits are activated based on this write clock CLK0. This eliminates the effect of the change in temperature on the scanning.

Although not shown, when there are plurality of beams, there is one laser driving unit, one laser diode, two laser detecting sensors, and one write clock frequency CLK0 corresponding to each laser beam.

However, the amount of calculations required to generate the write clocks of an appropriate frequency is vast. As a result, since a phase-locked loop (PLL) circuit is generally used to generate the write clocks, desired write clocks are not output. This causes color misalignment, i.e., the images produced by each laser beam shift from theoretical positions and therefore the images are not superposed properly.

SUMMARY OF THE INVENTION

It is an object of the present invention to solve at least the problems in the conventional technology.

An image forming apparatus according to one aspect of the present invention includes a plurality of optical systems and a plurality of image carriers, each optical system scanning a surface of a corresponding image carrier with a laser beam in a main scanning direction to form an image of a specific color on the image carrier; a plurality of first detecting units and a plurality of second detecting units, each first detecting unit being situated at a first position along the main scanning direction of a corresponding laser beam and each second detecting unit situated at a second position along the main scanning direction of the corresponding laser beam, wherein the first detecting unit and the second detecting unit detect the corresponding laser beam; and a clock frequency adjusting unit that, counts number of clocks of a write clock during a period from when a desired one of the first detecting units detects the corresponding laser beam until a desired one of the second detecting unit detects the corresponding laser beam, selects a count of the number of clocks for one laser beam as a reference value, and adjusts a write clock frequency of each of the laser beams other than the one lased beam so as to coincide with the reference value.

A method of correcting timing for generating laser beams according to another aspect of the present invention is executed in an image forming apparatus. The image forming apparatus has a plurality of optical systems and a plurality of image carriers, each optical system scanning a surface of a corresponding image carrier with a laser beam in a main scanning direction to form an image of a specific color on the image carrier. The method includes detecting the laser beams at least at a first position and a second position, wherein the first position and the second position being on the main scanning direction of each laser beam; counting number of clocks of a write clock during a period from when the laser beam is detected at a desired one of the first position until the laser beam is detected at a desired one of the second position; selecting a count of the number of clocks for one laser beam, out of the counts of the number of clocks for the laser beams, as a reference value; and adjusting a write clock frequency of each of the laser beams other than the one lased beam so as to coincide with the reference value.

The other objects, features and advantages of the present invention are specifically set forth in or will become apparent from the following detailed descriptions of the invention when read in conjunction with the accompanying drawings.

The other objects, features and advantages of the present invention are specifically set forth in or will become apparent from the following detailed descriptions of the invention when read in conjunction with the accompanying drawings.

DETAILED DESCRIPTION

Exemplary embodiments of an image forming apparatus and a method of correcting timing for generating laser beams according to the present invention are explained below with reference to the accompanying drawings.

Figure 1:
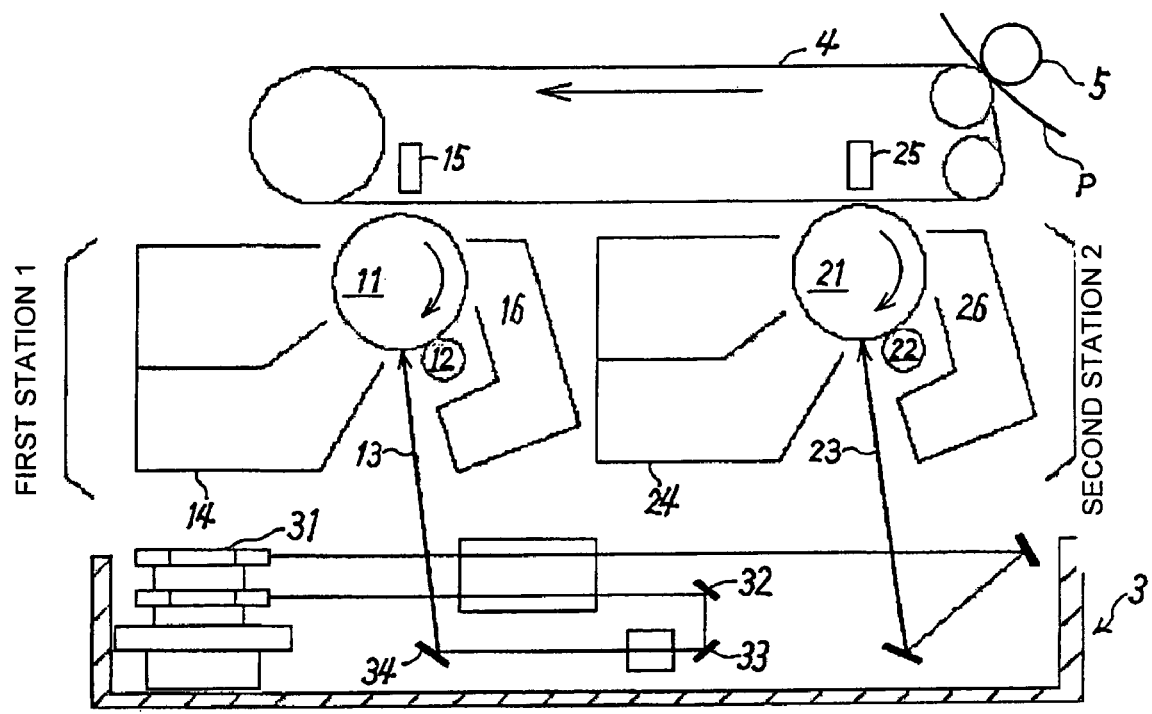
FIG. 1 is a schematic diagram of an image forming apparatus according to a first embodiment of the present invention.

FIG. 1 is a schematic diagram of a two-color image forming apparatus having two beams that obtains an image of two colors by guiding the beams onto photoreceptors 11 and 21 as a first station 1 and a second station 2, and developing images by developing units 14 and 24 having different colors.

As shown in FIG. 1, the image forming apparatus includes a first station 1 and a second station 2 as image forming units, a laser-beam scanning device 3, an intermediate transfer belt 4, a secondary transfer device 5, and a fixing device (not shown). The first station 1 forms an image for a black color, and the second station 2 forms an image for a red color, for example. The intermediate transfer belt 4 has a mark indicating a reference position.

A charging unit 12, a laser beam 13, the developing unit 14, a primary transfer unit 15, and a cleaning unit 16 are arranged around the outer periphery of the photoreceptor 11 of the first station 1. Likewise, a charging unit 22, a laser beam 23, the developing unit 24, a primary transfer unit 25, and a cleaning unit 26 are arranged around the outer periphery of the photoreceptor 21 of the second station 2.

An image is formed by the process as follows based on the configuration. In the first station 1, the charging unit 12 uniformly charges the outer peripheral surface of the photoreceptor 11 while the photoreceptor 11 is rotated. When detecting the mark on the intermediate transfer belt 4, the laser-beam scanning device 3 focuses a laser beam radiated from a laser unit (not shown) in a sub-scanning direction through a cylindrical lens (not shown), and a polygon mirror 31 deflects the beam. Mirrors 32, 33, and 34 reflect the beam deflected by the polygon mirror 31 onto the photoreceptor 11. Accordingly, the laser beam 13 performs scanning on the charged portion of the photoreceptor 11 with an optical signal corresponding to an image signal to form an electrostatic latent image thereon. The developing unit 14 for a black color develops the formed electrostatic latent image.

Likewise, in the second station 2, the charging unit 22 uniformly charges the outer peripheral surface of the photoreceptor 21 while the photoreceptor 21 is rotated. The laser beam 23 performs scanning on the charged portion of the photoreceptor 21 with an optical signal corresponding to an image signal to form an electrostatic latent image thereon. The developing unit 24 for a red color develops the formed electrostatic latent image.

An image is formed with a black toner on the photoreceptor 11 and an image is formed with a red toner on the photoreceptor 21. The transfer unit 15 transfers the black toner image onto the intermediate transfer belt 4, and then the transfer unit 25 transfers the red toner image superposedly onto the intermediate transfer belt 4. The superposed toner image of two colors is transferred from the intermediate transfer belt 4 onto a sheet of paper P by the secondary transfer device 5. The paper P with the image transferred thereon is conveyed to the fixing unit (not shown), where the transferred image is fixed by heat and pressure. The cleaning units 16 and 26 remove the toners remaining on the outer peripheral surfaces of the photoreceptors 11 and 21, respectively, and dechargers (not shown) remove the charges remaining on the outer peripheries.

Figure 2:
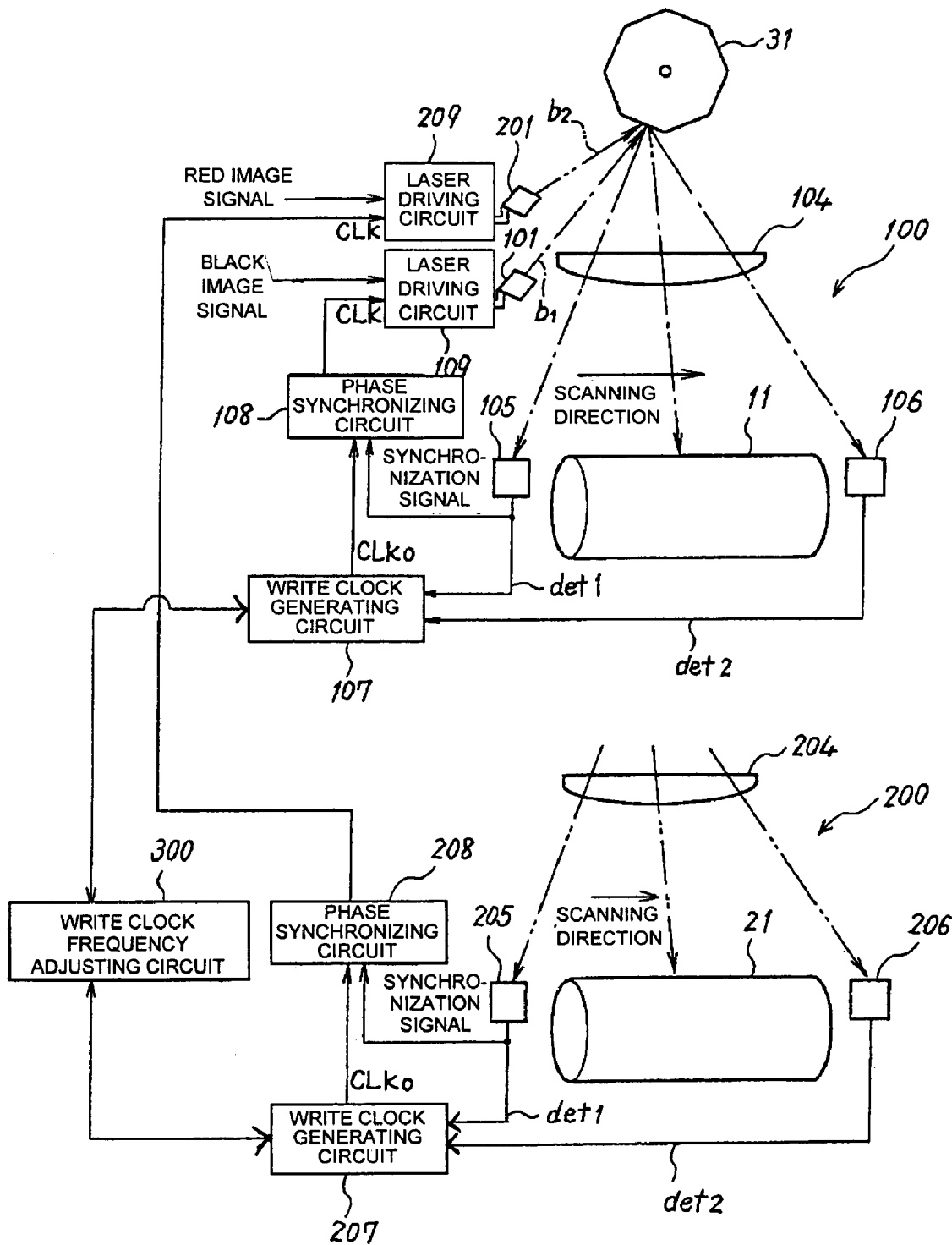
FIG. 2 is a conceptual diagram of an image forming section applied in FIG. 1.

FIG. 2 is a conceptual diagram of the laser-beam scanning device. A first optical writing section 100 that scans the photoreceptor 11 in the first station 1 and a second writing section 200 that scans the photoreceptor 21 in the second station 2 have the same configuration. Therefore, the first optical writing section 100 will be explained below, and detailed explanation of the second optical writing section 200 will be omitted.

In the first optical writing section 100, a beam b1 emitted from a laser diode 101 enters the polygon mirror 31. The polygon mirror 31 is a regular polygon, and rotates at a constant speed in a predetermined direction. The rotational speed is determined by a rotational speed of the drum-like photoreceptor 11, a writing density, and a number of facets of the polygon mirror 31.

The beam b1 incident into the polygon mirror 31 is reflected thereby, and the reflected beam is deflected through rotation of the polygon mirror 31. The deflected beam b1 enters an fθ lens 104. The fθ lens 104 is formed of a plastic lens for the purpose of cost reduction and weight reduction. The fθ lens 104 converts the beam so as to perform constant scanning on the photoreceptor 11 with a scanning beam having a constant angular velocity, forms an image on the photoreceptor 11 so as to be a minimum spot, and further has a plane tilt correcting mechanism.

The beam b1 having passed through the fθ lens 104 first reaches the position of a first laser beam detecting sensor 105 disposed outside an image region and is received by the sensor 105. Then, the beam b1 passes through the photoreceptor 11, and reaches the position of a second laser beam detecting sensor 106 disposed outside the image region, and is received by the sensor 106. The first laser beam detecting sensor 105 and the second laser beam detecting sensor 106 serve as a laser beam detecting section. Particularly, the first laser beam detecting sensor 105 also plays a role as a synchronization detecting sensor that detects a synchronization signal for laser-beam scanning as a synchronous detection sensor.

The first laser beam detecting sensor 105 and the second laser beam detecting sensor 106 receive the laser beams, and output the detection signals det 1 and det 2 to the write clock generating circuit 107.

The write clock generating circuit 107 measures a number of counts of a predetermined clock during a period between detection of one detection signal det 1 and detection of the other detection signal det 2. The write clock generating circuit 107 then outputs a write clock CLK0 according to the measured number of counts (hereinafter, also referred to as "a number of clocks").

At this time, the write clock generating circuit 107 outputs a plurality of clocks having mutually different phases as the write clock CLK0. Furthermore, the write clock generating circuit 107 can adjust writing magnification through generation of the write clock.

The write clock CLK0 output from the write clock generating circuit 107 is input into a phase synchronizing circuit 108. Further, the synchronous detection sensor obtained from the first laser beam detecting sensor 105 for one scan of the beam b1 is input into the phase synchronizing circuit 108.

The phase synchronizing circuit 108 selects a clock closest in phase to the synchronous detection sensor from a plurality of clocks having mutually different phases forming the write clock CLK0, and outputs the clock to the laser driving circuit 109 as a write clock CLK.

On the other hand, the laser driving circuit 109 makes the laser diode 101 emit a beam in synchronization with the write clock CLK based on the image signal for forming an image, and outputs the beam b1.

Figure 3:
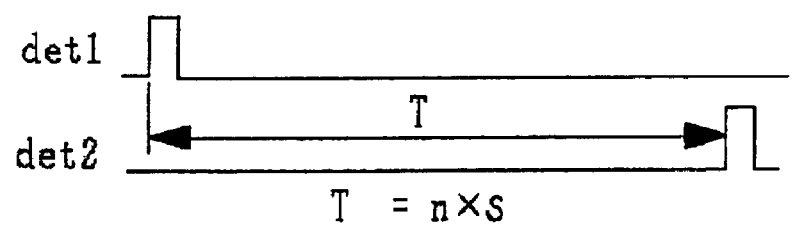
FIG. 3 is a timing chart of a scanning time.

In the first and second optical writing sections 100 and 200, as shown in FIG. 3, the detection signal is sent twice for one scan as the detection signals det 1 and det 2 to the write clock generating circuits 107 and 207. The both signals have a relationship expressed by T=n×s, where a scanning time as a time difference between det 1 and det 2 is T, a number of clocks is n, and a write clock period is s.

Measurement of the scanning time T is conducted by averaging values obtained through scanning a plurality of times. For example, the average of plural pieces of data is used. Specifically, the data is obtained by multiplying one scanned value by a number of facets of the polygon mirror 31. Thus, a difference between scanning characteristics of the beam b1 due to figure tolerance of each facet of the polygon mirror 31 can be cancelled.

If the fθ lenses 104 and 204 get deformed or the figure tolerance of the polygon mirror 31 is changed due to ambient temperature or the like, positions of dots formed on the photoreceptor 11 are different from those on the photoreceptor 21 in the main scanning direction, which causes color misalignment.

For example, T1=n1×s and T2=n2×s are obtained, where a scanning time of the beam b1 in the first station 1 is T1, a scanning time of the beam b2 in the second station 2 is T2, the write clock frequencies of the beams are the same as each other, and a period of the frequencies is s.

If T1≠T2, the numbers of clocks within the scanning time become n1≠n2, and therefore the numbers of dots formed in a scanning region are different from each other. That is, when the image formed by the beam b1 and the image formed by the beam b2 are superposed on each other, color misalignment occurs.

To solve the problem, the image forming apparatus according to the first embodiment is configured to have the same number of clocks for the beams b1 and b2 and adjust a write clock frequency (i.e., period s2) so as to obtain, for example, T2=n1×s2. Alternatively, a write clock frequency (i.e., period s1) may be adjusted so as to obtain T1=n2=s1. More specifically, a write clock frequency adjusting circuit 300 is provided between the write clock generating circuit 107 and the write clock generating circuit 207 as shown in FIG. 2.

Conventionally, the write clock frequency CLK0 of the beams b1 and b2 is adjusted so as to coincide with a predetermined number of reference clocks set in advance. However, in a printer according to the first embodiment, the write clock frequency CLK0 of either one of the beams b1 and b2 is adjusted so as to coincide with the number of clocks of the other beam. Therefore, there is no need to adjust the write clock frequency CLK0 of either one of the beams. Moreover, the optical systems of the beams b1 and b2 are substantially the same as each other, which allows the respective numbers of counts to be changed, due to influence of the change in the ambient temperature, in the similar manner to each other. Thus, the configuration according to the embodiment, in which the write clock frequency CLK0 is made coincident with the number of counts of any one of the beams, can reduce the amount of adjustment of the write clock frequency CLK0, as compared with the conventional configuration in which the number of counts of the other beam is made coincident with the predetermined number of reference clocks. Accordingly, the output of the write clock frequency is stabilized after the adjustment as compared with the conventional configuration. Thus, it is possible to prevent positionally deviation between the beams in the main scanning direction and form an image with higher quality.

Figure 4:
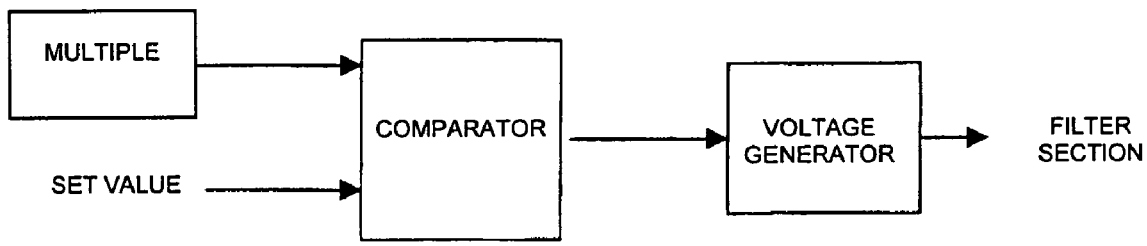
FIG. 4 is a block diagram of a PLL circuit.

The write clock frequency adjusting circuit 300 generates a modulated frequency of a write clock by multiplying the reference clock by N in the clock generating circuit (PLL) as shown in FIG. 4. A filter section of the PLL is formed with an element that can change a filter constant, which allows the filter constant to be changeable according to a range of variation when the multiple N is varied for adjusting the frequency. The multiple is compared with a preset range of variation, and if the number is beyond the range, the write clock frequency adjusting circuit 300 allows the element of the PLL to change the filter constant. The filter section is formed with a variable-capacitance element that can vary the capacitance by a voltage.

For example, when the first and second laser beam detecting sensors 105 and 106 detect the beam b1, the beam b1 is not lit up by units of dot, but the beam b1 is lit up immediately before the beam b1 cuts across one sensor, and is lit off after cutting across the other sensor. Resultantly, the beam b1 illuminates for a long period of time in terms of the units of dot. In this type of detecting method, however, even if the write clock frequency CLK0 is adjusted to change a dot position to be formed in the scanning region, the changed dot position cannot be detected by the beam b1.

To solve the problem, a linear CCD is provided as the second laser beam detecting sensor 106 disposed on a scan finish end side. The beam for detection of a position is lit up at a timing after the beam reaches the linear CCD, and thereby the position of the scanning beam can be detected. Furthermore, the linear CCD is provided as a second laser beam detecting sensor 206 of the second optical writing section 200 to perform detection in the same manner as explained above.

Figure 5:
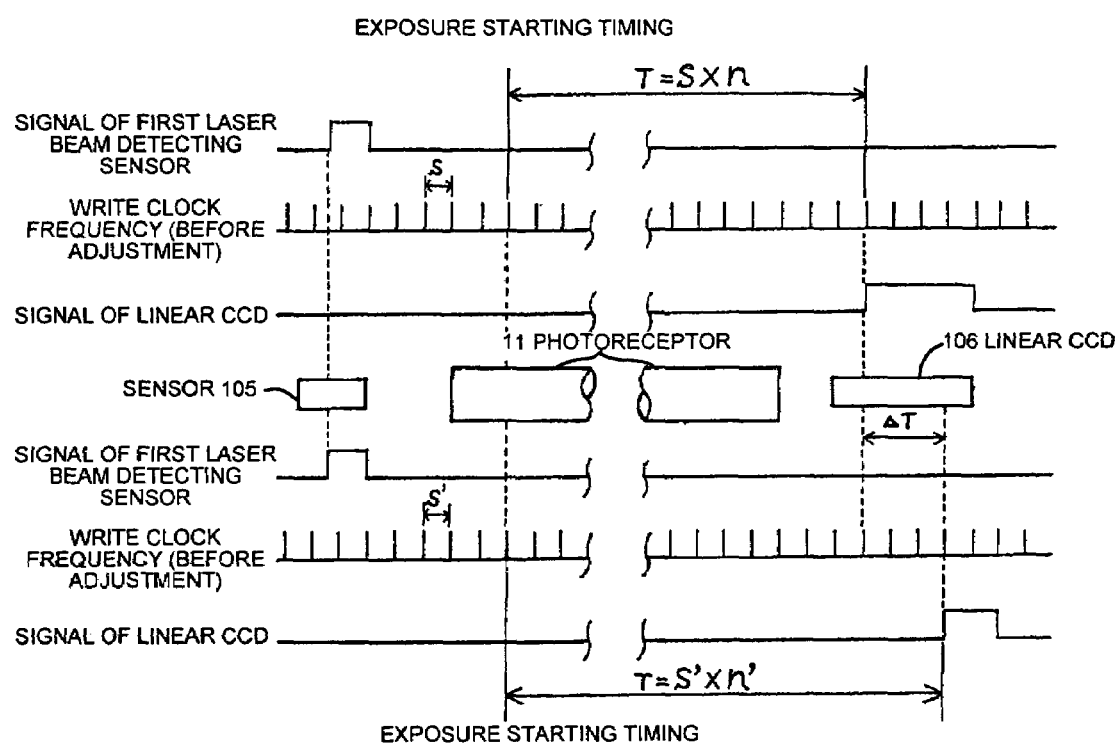
FIG. 5 is a timing chart when a result of adjustment is detected by a linear charge-coupled device (CCD)

FIG. 5 illustrates an example of a timing chart based on the configuration.

If the beam is lit up at respective predetermined numbers of clocks (the same timing) before and after the write clock frequency CLK0 is changed, the scanning times are shifted from each other by ΔT, which causes scanning positions of the beam b1 to be shifted. Therefore, the provision of the linear CCD for the second laser beam detecting sensor 106 makes the output signals of the linear CCD different, and allows the scanning positions of the laser beams to be detected. If the linear CCD has the same density as that for image formation, the formed dot (s) is shifted by an amount of deviation between the output signals. In the example of FIG. 5, it is found, from the output signal having the write clock frequency after the frequency is changed, that the scanning is extensively performed with the beam by three dots over the whole region in the main scanning direction, as compared with the output signal having the write clock frequency before the frequency is changed.

Therefore, by lighting up the beam b2 for detection at the predetermined number of clocks after the write clock frequency CLK0 of the second optical writing section 200 is adjusted, it is possible to confirm reduction in deviation between the scanning position of the beam b1 in the first optical writing section 100 and the beam b2.

The write clock frequency CLK0 in the write clock generating circuits 107 and 207 can be adjusted basically at a given timing other than the timing of the image formation. However, the adjustment of the write clock frequency of the present invention is provided for protection of image quality against environmental variations of the apparatus. Therefore, it is desirable that the timing of adjusting the write clock frequency CLK0 is set to a time at which the apparatus is started or the ambient temperature is changed by which the optical characteristics are predicted to be changed. It is also desirable that the timing is approached to the timing of image formation as close as possible. For example, the write clock frequency CLK0 is adjusted at a timing of pressing a start button. Consequently, the image is formed after the adjustment. Thus, it is possible to maintain image output with high quality without being affected by environmental variations with time.

If the write clock frequency CLK0 of the scanning beam is adjusted in the above manner, exposing energy on the photoreceptor is slightly changed. Therefore, it is desirable to set a process condition of forming an image after the write clock frequency CLK0 is adjusted.

Although an example of a two-color image forming apparatus has been explained above, it is needless to say that the present invention is applicable to any multi-color image forming apparatus. For example, the developing unit 14 in the first station 1 has two developing devices for magenta and cyan and a switching unit that selects one of these developing devices and drives the selected one. Further, the developing unit 24 in the second station 2 has two developing devices for black and yellow and a switching unit that selects one of these developing devices and drives the selected one. Images of four colors formed on the photoreceptors 11 and 21 using the developing devices are sequentially superposed on one another on the intermediate transfer belt 4, and it is thereby possible to form a full-color image.

Second Embodiment

In the first embodiment, the configuration having two laser beam detecting sensors in each of the optical write sections has been explained, but a scanning region is divided and a detection signal can be sent to the write clock generating circuit three times or more for one scan.

Figure 6:
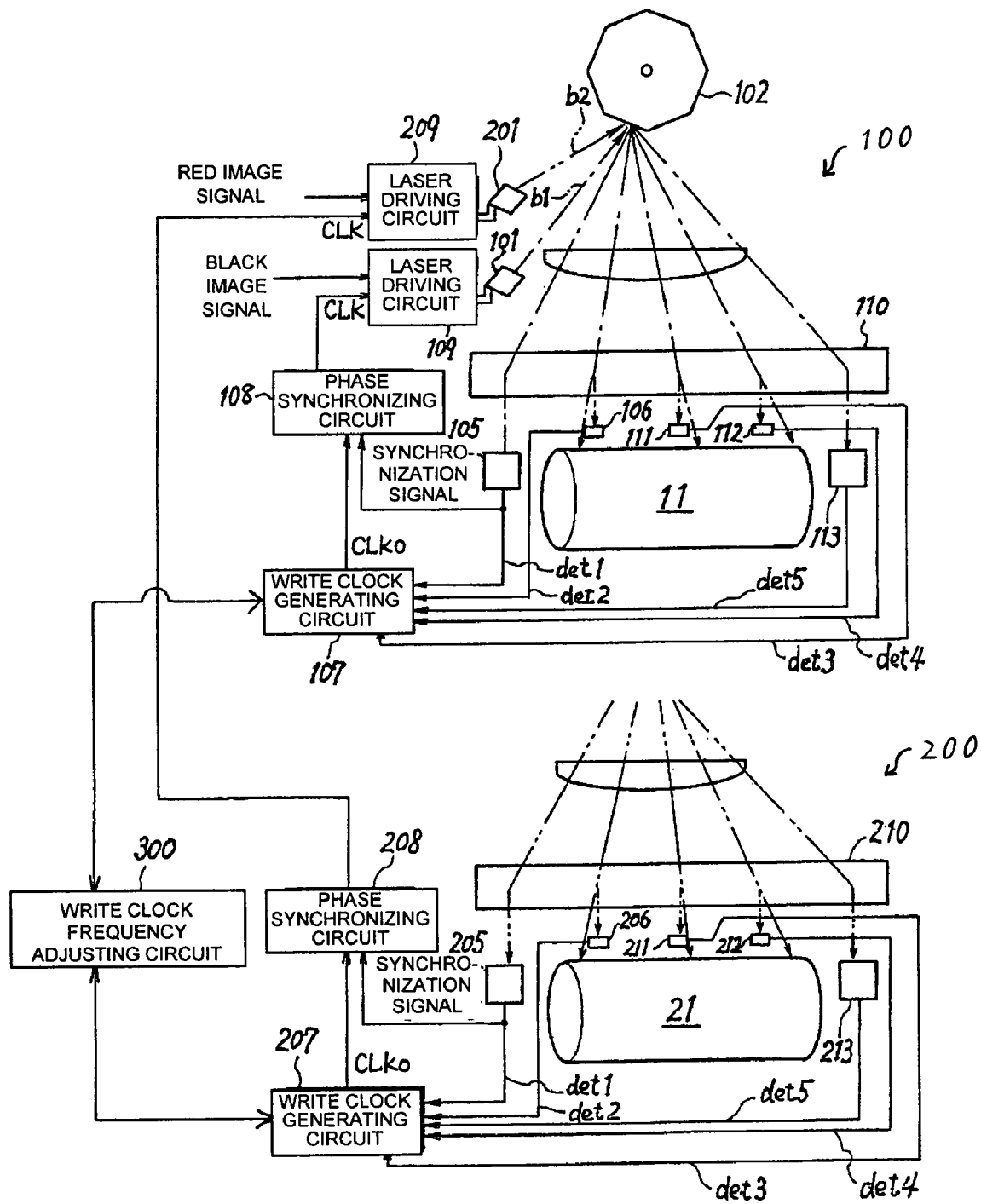
FIG. 6 is a conceptual diagram of an image forming section of an image forming apparatus according to a second embodiment of the present invention.

FIG. 6 illustrates an example of providing five laser beam detecting sensors in each of the optical writing sections and dividing the scanning region into four segments as a second embodiment of the present invention. The scanning beams b1 and b2 are split through half mirrors 110 and 210 and detected by laser beam detecting sensors disposed at equivalent positions to the photoreceptors 11 and 21, respectively. The scanning region is divided into four segments, and the frequency of each beam is adjusted in each divided segment so that the number of clocks for a predetermined period in a divided segment is the same as that in another divided segment.

Figure 7:
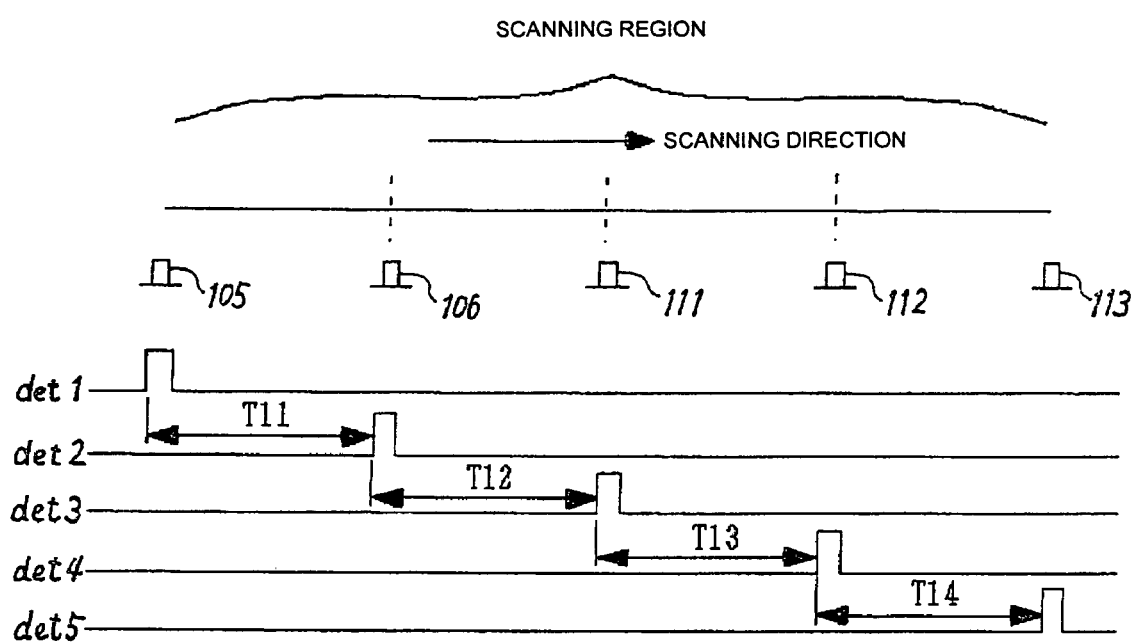
FIG. 7 is a timing chart of a scanning time according to the second embodiment.
Figure 8:
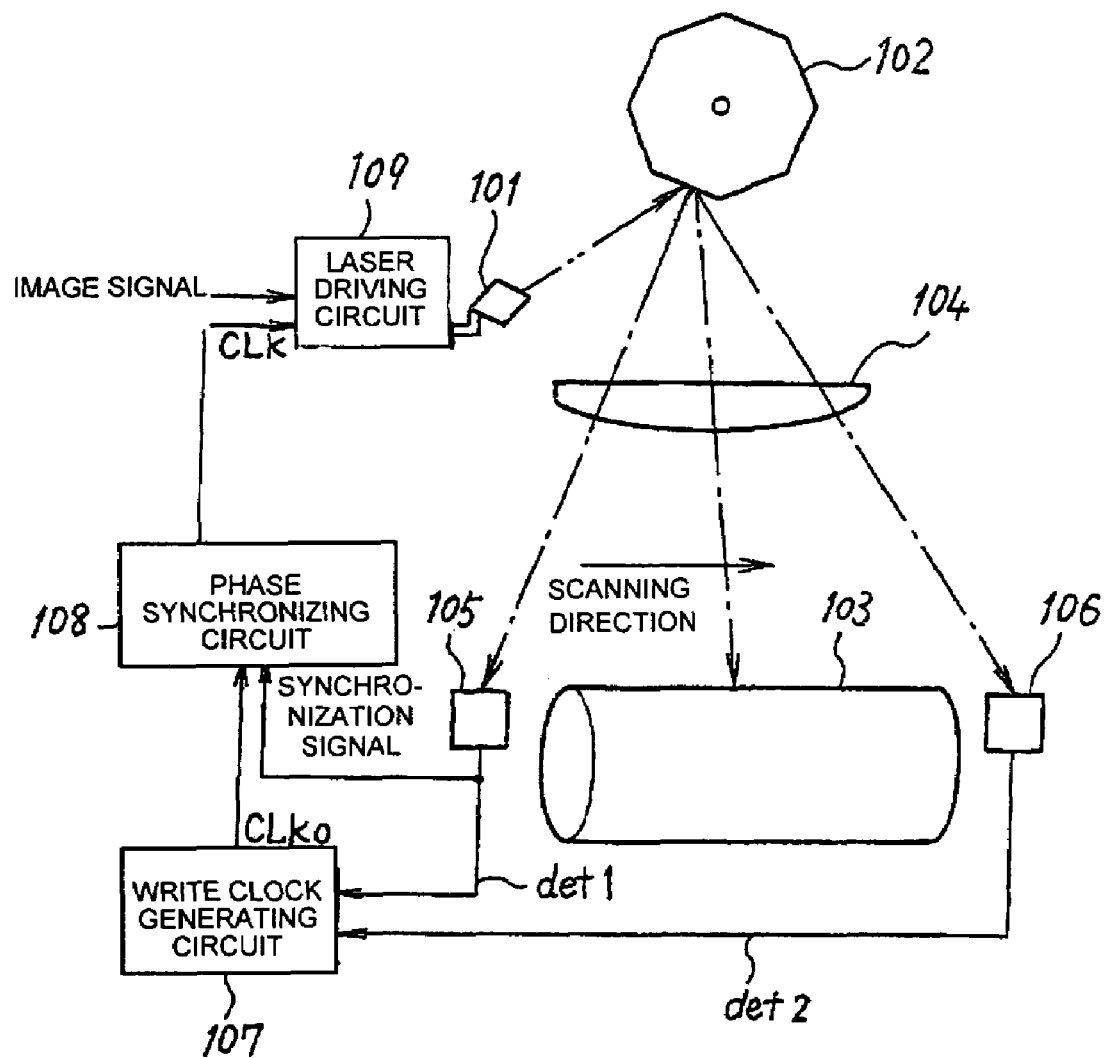
FIG. 8 is a conceptual diagram of an image forming section of a conventional image forming apparatus.

More specifically, as shown in FIG. 6, the laser beam detecting sensor is provided at each division point in addition to the scan start end and the scan finish end for each beam. That is, laser beam detecting sensors 105, 106, 111, 112, and 113 are disposed in the first optical writing section 100. Accordingly, a detection signal is sent to the write clock generating circuit 107 five times for one scan as detection signals det 1, det 2, det 3, det 4, and det 5. Likewise, laser beam detecting sensors 205, 206, 211, 212, and 213 are disposed in the second optical writing section 200. Accordingly, a detection signal is sent to the write clock generating circuit 207 five times for one scan as the detection signals det 1, det 2, det 3, det 4, and det 5.

as shown in FIG. 7, predetermined times in the divided segments are represented by beam detecting times T11 to T14 of the signals between det 1 and det 2, det 2 and det 3, det 3 and det 4, and det 4 and det 5, respectively. A plurality of predetermined times are also obtained in the second optical writing section 200 in the same manner as explained above.

The predetermined times are obtained like $T11=n11 \times s1$, $T12=n12 \times s1$, $T13=n13 \times s1$, and $T14=n14 \times s1$, where a clock period of the beam b1 is s1, and the predetermined times in the segments are T11, T12, T13, and T14, and thereby the number n x (x=1 to 4) of clocks in each segment is obtained.

Furthermore, the predetermined times are obtained like $T21=n21 \times s2$, $T22=n22 \times s2$, $T23=n23 \times s2$, and $T24=n24 \times s2$, where a clock period of the beam b2 is s2, and the predetermined times in the segments are T21, T22, T23, and T24. It is noted that s1=s2 is initially set.

If the scanning times (predetermined times) in the respective segments are the same as each other, then the numbers of clocks are the same, which does not cause color misalignment to occur. Therefore, there is no need to adjust the write clock frequency CLK0.

On the other hand, if the scanning time of each beam in the first segment is T11≠T21, the clock frequency CLK0 in the first segment of the beam b2 is adjusted so as to be $T21=n11 \times s2$ (=T11) where the number of clocks is n11. If the scanning times in the segments are different, the clock frequency CLK0 is adjusted in each segment in the same manner. Then, the frequency is switched to the adjusted write clock frequency CLK0 in each segment to modulate the scanning beam. Since the light amount is lowered by splitting the beam through the half mirrors 110 and 210, the light amount of beams is set in advance.

When the write clock frequency CLK0 is adjusted in each divided segment, there is a case such that the frequency CLK0 may be made higher in some segment and may be lower in some other segment if the clock frequency CLK0 of only one of the two beams b1 and b2 is adjusted. In this case, a variation range of the multiple becomes large and it is thereby hard to obtain a stable clock. In such a case, therefore, it is desirable that the beam b1 and the beam b2 share the processing of adjusting the write clock frequency CLK0. For example, if the clock frequency CLK0 of the beam b2 needs to be made higher in one segment and needs to be made lower in the other segments, the clock frequency CLK0 of the beam b1 is adjusted so as to be made higher in the other segments. More specifically, if the number of clocks is 100 in one main scan, the write clock frequency CLK0 for each segment is selected from the number of clocks of the beam b1 or the number of clocks of the beam b2. The selected number of clocks is a value approximate to the number of clocks of 25 obtained by dividing the number of clocks of 100 into four. Thus, it is possible to suppress the amount of adjustment of the write clock frequency CLK0 to a small value and obtain a stable clock frequency.

According to the second embodiment, the printer as the image forming apparatus has a plurality of optical systems, forms images on different positions to form latent images on the photoreceptors as image carriers using a plurality of beams deflected for scanning by the optical systems, and visualizes the latent images through development using different colors. The printer includes the beam detecting units, disposed at two or more positions within one main scan of each of the beams, each of which detects a beam, and the write clock generating circuits as counters. Each of the counters counts the number of counts of a predetermined clock during the period from when one beam detecting unit detects one of the beams until another beam detecting unit detects the beam. The printer also includes the write clock frequency adjusting circuit as a clock frequency adjusting unit that adjusts a write clock frequency of either one of the counted beams so as to coincide with the number of counts of the other beam.

The printer as the image forming apparatus includes the beam detecting units disposed at two positions, at a scan start end and a scan finish end of the beam within one main scan of each of the beams. Therefore, by providing the first laser beam detecting sensor and the second laser beam detecting sensor as the beam detecting units at the two positions, these sensors are disposed on both sides of the photoreceptor, which eliminates the need for provision of a half mirror or the like in particular. Thus, cost reduction is achieved.

The printer includes the beam detecting units disposed at three or more positions for each of the beams. The beam detecting unit calculates a number of clocks of a write clock during a period from when one of the beam detecting units detects one of the beams until an adjacent beam detecting unit detects the beam, and sets the number of clocks of any one of the beams as a number of reference clocks. Thus, the number of clocks can be made coincident with the number of reference clocks for each scanning segment. The scanning segment is obtained by dividing one main scanning region of each optical writing system into a plurality of scanning segments. Moreover, variations in misregistration between superposed images can be further reduced over the whole scanning region.

The printer includes a write clock generating unit that generates a write clock. The write clock generating unit is formed with a PLL that multiplies the reference clock by N to generate a write clock frequency, and the write clock frequency is adjusted by changing the multiple N. The PLL is configured so that a filter constant thereof is made variable, and the filter constant is changed according to an amount of change of the multiple N if the multiple N is to be changed, where N is a positive integer. Thus, it is possible to obtain a stable clock even if the frequency is changed.

In the printer, the write clock frequency adjusting circuit as the clock frequency adjusting unit is configured so that a number of reference clocks can be selectively obtained from among numbers of clocks of the beams for each period from when one of the beam detecting units detects one of the beams until an adjacent beam detecting unit detects the beam. Specifically, the number of reference clocks is such that the range of variation in the number of clocks is a minimum over the whole period. Thus, it is possible to obtain a further stable write clock.

In the printer, the laser beam detecting sensor as the beam detecting unit disposed at the scan finish end is formed with a linear CCD. The linear CCD can detect a scanning position of the beam. For example, if the frequency and the number of clocks of the write clock are adjusted and then the beam is lit up at a timing at which the adjusted number of clocks has been counted from an exposure starting timing, and if a deviation occurs between the scanning positions, then the adjustment is thought to be insufficient. In this case, the frequency of the write clock is adjusted again to correct the deviation between the scanning positions.

In the printer, the write clock frequency of the write clock frequency adjusting circuit as the clock frequency adjusting unit is adjusted when the apparatus is started and when ambient temperature is largely changed to be higher than a preset value. Thus, it is possible to reduce the misregistration and color misalignment between superimposed images even if the ambient temperature is changed.

In the printer, a difference between scanning times of the scanning beams is determined from an average of a plurality of the scanning times, and the write clock frequency is adjusted. As explained above, the difference in scanning time between the beams is determined from the averaged scanning time to adjust the scanning times, and therefore the effect due to the adjustment can be expected over the whole reflective facets (rotating polygon mirror). Moreover, the clock adjustment can be easily controlled.

In the printer, a condition of developing process is set after the write clock frequency is adjusted. Thus, it is possible to reduce the misregistration and color misalignment between superposed images, and at the same time to obtain image density with fidelity to image data.

The printer includes the intermediate transfer belt as an intermediate transfer body of which surface moves endlessly, and the stations as a plurality of image forming units disposed opposite to the moving surface of the intermediate transfer belt. Each of the stations includes the photoreceptor as an image carrier, the optical writing section as a writing unit, the developing devices as at least two developing units that develop an electrostatic latent image formed on the photoreceptor by the optical writing section, and the switching unit that selects one of the developing devices and drives the selected one. Thus, it is possible to form an image with high quality by reducing the misregistration and color misalignment between superposed images even in any compact, low-cost, yet high-speed image forming apparatus.

The present invention has an advantageous effect such that it is possible to form a higher quality image by preventing positionally deviation between a plurality of beams.

The present document incorporates by reference the entire contents of Japanese priority document, 2002-276635 filed in Japan on Sep. 24, 2002.

Although the invention has been described with respect to a specific embodiment for a complete and clear disclosure, the appended claims are not to be thus limited but are to be construed as embodying all modifications and alternative constructions that may occur to one skilled in the art Which fairly fall within the basic teaching herein set forth.

What is claimed is:

1. An image forming apparatus, comprising:
a plurality of optical systems and a plurality of image carriers, each optical system scanning a surface of a corresponding image carrier with a laser beam in a main scanning direction to form an image of a specific color on the image carrier;
a plurality of first detecting units and a plurality of second detecting units, each first detecting unit being situated at a first position along the main scanning direction of a corresponding laser beam and each second detecting unit situated at a second position along the main scanning direction of the corresponding laser beam, wherein the first detecting unit and the second detecting unit detect the corresponding laser beam;
clock generating units for each laser beam; and
a plurality of third detecting units, each third detecting unit being situated at a third position along the main scanning direction of a corresponding laser beam, wherein the third detecting unit detects the corresponding laser beam, wherein a clock frequency adjusting unit configured (a) to count a number of clocks of a write clock during a period from when any of the first detecting units, the second detecting units, and the third detecting units detects the corresponding laser beam until any of an adjoining first detecting unit, second detecting unit, and third detecting unit detects the corresponding laser beam, (b) to take a count of the number of clocks for one laser beam as a reference value, and (c) to adjust a write clock frequency of each of the laser beams other than the one lased beam so as to coincide with the reference value.

2. An image forming apparatus, comprising:

a plurality of optical systems and a plurality of image carriers, each optical system scanning a surface of a corresponding image carrier with a laser beam in a main scanning direction to form an image of a specific color on the image carrier;

a plurality of first detecting units and a plurality of second detecting units, each first detecting unit being situated at a first position along the main scanning direction of a corresponding laser beam and each second detecting unit situated at a second position along the main scanning direction of the corresponding laser beam, wherein the first detecting unit and the second detecting unit detect the corresponding laser beam;

clock generating units for each laser beam;

a clock frequency adjusting unit configured to count a number of clocks of a write clock during a period from when a desired one of the first detecting units detects the corresponding laser beam until a desired one of the second detecting unit detects the corresponding laser beam, selects a count of the number of clocks for one laser beam as a reference value, and adjusts using the clock generating units a write clock frequency of each of the laser beams other than the one lased beam so as to coincide with the reference value, wherein the clock frequency adjusting unit includes a phase-locked loop with variable filters and that multiplies a reference clock by a multiple N, and the clock frequency adjusting unit varies the number of filters in the phase-locked loop and the multiple N to adjust the write clock frequency.

3. A method of correcting timing for generating laser beams in an image forming apparatus, the image forming apparatus having a plurality of optical systems and a plurality of image carriers, each optical system scanning a surface of a corresponding image carrier with a laser beam in a main scanning direction to form an image of a specific color on the image carrier, the method comprising:

detecting the laser beams at least at a first position and a second position, wherein the first position and the second position being on the main scanning direction of each laser beam;

counting a number of clocks of a write clock during a period from when the laser beam is detected at a desired one of the first position until the laser beam is detected at a desired one of the second position;

selecting a count of the number of clocks for one laser beam, out of the counts of the number of clocks for the laser beams, as a reference value;

adjusting with a unit shared by the optical systems a write clock frequency of each of the laser beams other than the one laser beam so as to coincide with the reference value; and setting a condition of image forming process after the adjusting of the write clock frequency.

4. An image forming method, comprising:

scanning, using a plurality of optical systems and a plurality of image carriers, each optical system scanning a surface of a corresponding image carrier with a laser beam in a main scanning direction to form an image of a specific color on the image carrier;

detecting, using a plurality of first detecting units and a plurality of second detecting units, each first detecting unit being situated at a first position along the main scanning direction of a corresponding laser beam and each second detecting unit situated at a second position along the main scanning direction of the corresponding laser beam, wherein the first detecting unit and the second detecting unit detect the corresponding laser beam; and adjusting, using a clock frequency adjusting unit shared by the optical systems configured to count a number of clocks of a write clock during a period from when a desired one of the first detecting units detects the corresponding laser beam until a desired one of the second detecting unit detects the corresponding laser beam and selects a count of the number of clocks for one laser beam as a reference value, a write clock frequency of each of the laser beams other than the one lased beam so as to coincide with the reference value, wherein a condition of image forming process is set after the clock frequency adjusting unit performs the adjustment of the write clock frequency.

5. An image forming method, comprising:

scanning, using a plurality of optical systems and a plurality of image carriers, each optical system scanning a surface of a corresponding image carrier with a laser beam in a main scanning direction to form an image of a specific color on the image carrier;

detecting, using a plurality of first detecting units and a plurality of second detecting units, each first detecting unit being situated at a first position along the main scanning direction of a corresponding laser beam and each second detecting unit situated at a second position along the main scanning direction of the corresponding laser beam, wherein the first detecting unit and the second detecting unit detect the corresponding laser beam;

detecting, using a plurality of third detecting units, each third detecting unit being situated at a third position along the main scanning direction of a corresponding laser beam, wherein the third detecting unit detects the corresponding laser beam, and adjusting a write clock frequency, using a clock frequency adjusting unit shared by the optical systems and, the write clock frequency adjusting unit configured (a) to count a number of clocks of a write clock during a period from when any of the first detecting units, the second detecting units, and the third detecting units detects the corresponding laser beam until any of an adjoining first detecting unit, second detecting unit, and third detecting unit detects the corresponding laser beam, (b) to take a count of the number of clocks for one laser beam as a reference value, and (c) to adjust the write clock frequency of each of the laser beams other than the one lased beam so as to coincide with the reference value.

6. An image forming method, comprising:

scanning, using a plurality of optical systems and a plurality of image carriers, each optical system scanning a surface of a corresponding image carrier with a laser beam in a main scanning direction to form an image of a specific color on the image carrier;

detecting, using a plurality of first detecting units and a plurality of second detecting units, each first detecting unit being situated at a first position along the main scanning direction of a corresponding laser beam and each second detecting unit situated at a second position along the main scanning direction of the corresponding laser beam, wherein the first detecting unit and the second detecting unit detect the corresponding laser beam;

adjusting, using a clock frequency adjusting unit shared by the optical systems configured to count a number of clocks of a write clock during a period from when a desired one of the first detecting units detects the corresponding laser beam until a desired one of the second detecting unit detects the corresponding laser beam and selects a count of the number of clocks for one laser beam as a reference value, a write clock frequency of each of the laser beams other than the one lased beam so as to coincide with the reference value, wherein the clock frequency adjusting unit includes a phase-locked loop with variable filters and that multiplies a reference clock by a multiple N, and the clock frequency adjusting unit varies the number of filters in the phase-locked loop and the multiple N to adjust the write clock frequency.

7. An image forming method, comprising:

forming, using a plurality of optical systems, an image of a specific color on each of a plurality of image carriers using laser beams;

detecting, using a plurality of first detecting units and a plurality of second detecting units, the laser beams; and adjusting, using a clock frequency adjusting unit shared by the optical systems and which is configured to counts a number of clocks of a write clock, a write clock frequency based on detections performed by the plurality of first detecting units and the plurality of second detecting units, wherein a condition of image forming process is set after the clock frequency adjusting unit performs the adjustment of the write clock frequency.

8. An image forming method, comprising:

forming, using a plurality of optical systems, an image of a specific color on each of a plurality of image carriers using laser beams;

detecting, using a plurality of first detecting units, a plurality of second detecting units, and a plurality of third detecting units, the laser beams; and adjusting, using a clock frequency adjusting unit shared by the optical systems and which is configured to count a number of clocks of a write clock, a write clock frequency based on detections performed by the plurality of first detecting units, the plurality of second detecting units, and the plurality of third detecting units, wherein the clock frequency adjusting unit counts a number of clocks of a write clock and adjusts a write clock frequency.

9. An image forming method, comprising:

forming, using a plurality of optical systems, an image of a specific color on each of a plurality of image carriers using laser beams;

detecting, using a plurality of first detecting units and a plurality of second detecting units, the laser beams; and adjusting, using a clock frequency adjusting unit shared by the optical systems and which is configured to count a number of clocks of a write clock, a write clock frequency based on detections performed by the plurality of first detecting units and the plurality of second detecting units, wherein the clock frequency adjusting unit includes a phase-locked loop with variable filters.

* * * * *